US007343178B2

(12) United States Patent
Morishima

(10) Patent No.: US 7,343,178 B2
(45) Date of Patent: Mar. 11, 2008

(54) MOBILE TERMINAL, DISPLAY SWITCHING METHOD OF MOBILE TERMINAL, AND RECORDING MEDIUM FOR RECORDING DISPLAY SWITCHING PROGRAM

(75) Inventor: Masaaki Morishima, Tokyo (JP)

(73) Assignee: NEC Corporation, Tokyo (JP)

( * ) Notice: Subject to any disclaimer, the term of this patent is extended or adjusted under 35 U.S.C. 154(b) by 1164 days.

(21) Appl. No.: 09/986,055

(22) Filed: Nov. 7, 2001

(65) Prior Publication Data

US 2002/0081997 A1 Jun. 27, 2002

(30) Foreign Application Priority Data

Nov. 7, 2000 (JP) ............................. 2000-339607

(51) Int. Cl.
*H04B 1/38* (2006.01)
(52) U.S. Cl. ................ 455/566; 455/426.1; 455/414.1; 345/173
(58) Field of Classification Search ................ 455/413, 455/414.3, 466, 566, 426, 412.1, 422.1, 426.1, 455/414.1; 345/173
See application file for complete search history.

(56) References Cited

U.S. PATENT DOCUMENTS

| 5,737,394 | A | | 4/1998 | Anderson et al. | |
| 6,078,820 | A | * | 6/2000 | Wells et al. | ................ 455/466 |
| 6,192,258 | B1 | * | 2/2001 | Kamada et al. | ............. 455/566 |
| 6,389,278 | B1 | * | 5/2002 | Singh | ...................... 455/414.3 |
| 6,459,906 | B1 | | 10/2002 | Yang | |
| 6,463,304 | B2 | * | 10/2002 | Smethers | .................... 455/566 |
| 6,553,220 | B1 | * | 4/2003 | Marks | ........................ 455/413 |
| 6,600,930 | B1 | * | 7/2003 | Sakurai et al. | ........... 455/414.3 |

FOREIGN PATENT DOCUMENTS

| CN | 1268859 | 10/2000 |
| EP | 0 651 544 A2 | 5/1995 |
| EP | 0 964 328 A2 | 12/1999 |
| JP | 11-205484 | 7/1999 |
| JP | 2000-216808 | 8/2000 |
| JP | 2000-253106 | 9/2000 |
| JP | 2000-278751 | 10/2000 |
| JP | 2000-307768 | 11/2000 |

OTHER PUBLICATIONS

Phillips, Method and system for electronic commerce using a mobile communication system, Sep. 5, 2002.*
"AERO 8000 H/PC Professional Reference Guide", Compaq Aero 8000 H/PC Professional, Fourth Edition, Oct. 1999, pp. 1.1-5.84, XP-002263584.

* cited by examiner

*Primary Examiner*—Gerald Gauthier
(74) *Attorney, Agent, or Firm*—Young & Thompson

(57) ABSTRACT

An operator presses an e-mail mode selecting key, and a control unit shifts an e-mail mode from a standby mode. A display device displays a menu selecting screen of an e-mail and the operator thereafter creates the e-mail while viewing a display screen. The operator presses a mode switching key to refer to the content of a predetermined homepage, and the control unit shifts to a browser mode from the e-mail mode in which the display device displays a menu selecting screen of a browser and the operator browses the homepage after inputting a corresponding URL. The operator presses the mode switching key in the browser mode and the control unit shifts, from the browser mode, to the e-mail mode in which the display device returns to the screen for creating the e-mail. The operator continuously creates the e-mail.

19 Claims, 13 Drawing Sheets

FIG. 3A
CONVENTIONAL ART

1. CREATE E-MAIL
2. RECEIVE E-MAIL
3. SEND E-MAIL

[RETURN] [SELECT]

FIG. 3B
CONVENTIONAL ART

CREATE E-MAIL

ADDRESSED:

TITLE

[RETURN] [SELECT]

FIG. 3C
CONVENTIONAL ART

INFORMATION ON ALUMNI ASSOCIATION

DATE: OCT.1
       5:00 P.M.

PLACE: B RESTAURANT

CHARGE: ¥5,000

[RETURN] [SELECT]

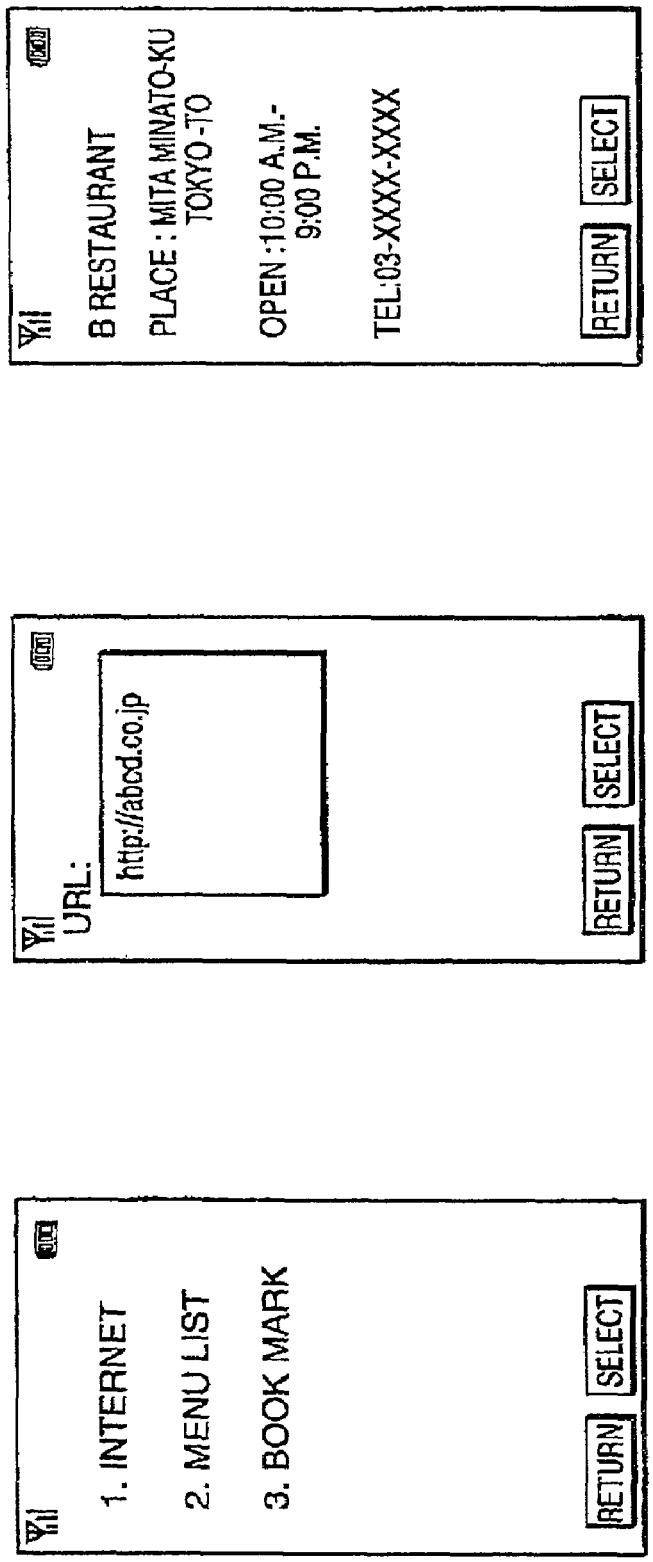

1. ORDER CHECK

PUBLISHER : A CORPORATION
TITLE : CREATE HOMEPAGE
PRICE : ¥1,200
AMOUNT : 1

E-MAIL RECEIVED

NOT READ E-MAIL : 1

[RETURN] [SELECT]

1. ORDER CHECK
   PUBLISHER
   TITLE
   PRICE
   AMOUNT
2. SHIPPED
   BUYER
   ADDRESS
   E-MAIL

E-MAIL RECEIVED

NOT READ
E-MAIL : 1

[RETURN] [SELECT]

MOBILE TERMINAL, DISPLAY SWITCHING METHOD OF MOBILE TERMINAL, AND RECORDING MEDIUM FOR RECORDING DISPLAY SWITCHING PROGRAM

BACKGROUND OF THE INVENTION

1. Field of the Invention

The present invention relates to a mobile terminal, such as a mobile phone, including data communication functions, e.g., a browser for browsing a web page via the Internet and a mailer for sending and receiving an e-mail, a display switching method for switching a display screen when the browser in the mobile terminal operates and a display screen when the mailer operates, and a recording medium for recording a display switching program for implementing the display switching method.

2. Description of the Related Art

In recent years, the Internet is greatly widespread, and e-mails are frequently used, Radio mobile terminals such as mobile phones have not only an inherent call function but also data communication functions, e.g. a browser for accessing a web page via the Internet and a mailer for sending and receiving an e-mail, thus easily enjoying an Internet access service and an e-mail service anytime and anywhere.

Referring to FIG. 1, a conventional mobile phone 101, as the above-mentioned mobile terminal, comprises a display device 102 having a liquid crystal display device, and an input unit 103 having a plurality of operational keys. The input unit 103 comprises a browser mode selecting key 103a for starting a browser and browsing a web page, an e-mail mode selecting key 103b for sending and receiving an e-mail, a communication mode selecting key 103c for communication, a browser mode clear key 103d for returning to a standby screen for a browser screen, an e-mail mode clear key 103e for returning to a standby mode screen from an e-mail screen, a power key 103f, a ten-key 103g for inputting numbers, and a cursor key 103h for moving a cursor in the vertical and horizontal directions on the display screen.

A description is given of operations of the conventional mobile phone 101 with reference to FIG. 2.

First, power is turned on (step ST101). A control unit (not shown) in the mobile phone 101 enters the standby mode of operators input operation and reception of the e-mail, and the display device 102 displays a predetermined standby screen (step ST102).

In the above-mentioned state, the operator presses the e-mail mode selecting key 103b (step ST103). The control unit enters an e-mail mode, and the display device 102 displays an e-mail screen as shown in FIGS. 3A to 3C (step ST104). On a menu selecting screen (in FIG. 3A), the operator selects, for example, "create e-mail". Then, as shown in FIGS. 3B and 3C, an e-mail creating screen is displayed and, when the operator as a secretary for an alumni association sends information to members, he inputs the addresses of the members, and creates and sends the text of information.

In the e-mail mode, an e-mail mode clear key 103e is pressed (step ST105). Then, the control unit returns to the standby mode and the display device 102 displays the standby screen. When the e-mail mode clear key 103e is not pressed, the display device 102 continuously displays the e-mail mode screen.

When the browser mode selecting key 103a is pressed in the standby mode (step ST106), the control unit shifts to the browser mode in which the display device 102 displays the browser screen as shown in FIGS. 4A to 4C (step ST107). When the operator selects, for example, "Internet" on the menu selecting screen (in FIG. 4A), the display device 102 displays a URL (Uniform Resource Locator) input screen for inputting a URL to specify a unique resource on the Internet. The operator inputs a predetermined URL, accesses a desired web page of a restaurant to be used as a party place of the alumni association, the content of the web page displayed on the display device 102 is browsed.

When the browser mode clear key 103d is pressed in the browser mode, the control unit returns to the standby mode in which the display device 102 displays the standby screen. When the browser mode clear key 103d is not pressed, the display device 102 continuously displays the screen of the browser mode.

When neither the browser mode selecting key 103a nor the e-mail mode selecting key 103b is pressed and power is not turned off (step ST109), the standby mode continues and the standby screen is displayed.

When the operator desires to switch the screen from the browser mode to the e-mail mode, the browser mode clear key 103d needs to be pressed once, thus returning to the standby mode. After that, the e-mail mode selecting key 103b needs to be pressed. Therefore, there is a problem in that the number of times for operating the keys is large and the switching operation takes a long time.

If the web page of the restaurant, as the party place of the alumni association, is accessed and the location, the telephone number, service contents, etc. are checked in the browser mode, after that, the information on the opening of the alumni association is sent to the members via the email, the browser mode clear key 103d and the e-mail mode selecting key 103b are pressed. Further, when it is necessary to operate the keys displayed on the screen and the cursor key 103h, as shown in FIGS. 3A to 3C, the information can be inputted by performing the above operations, excluding the operation for inputting characters, at least four times.

In particular, thereafter, when the content of the web page (the telephone number, etc.) is checked once again, the e-mail mode clear key 103e needs to pressed. Further, it is necessary to press the browser mode selecting key 103a, the keys displayed on the screen, the cursor key 103h, or the like, and input characters again, as shown in FIGS. 4A to 4C.

Accordingly, there is a problem in that the operation of keys is complicated and the operability is inferior.

SUMMARY OF THE INVENTION

The present invention is made under the above circumstances, and it is an object of the present invention to provide a mobile terminal for easily switching a browser mode and an e-mail mode with the number of times for operating keys, a display switching method in the mobile terminal, and a recording medium for recording a display switching program.

To solve the above-mentioned problems, according to a first aspect of the present invention, there is provided a mobile terminal comprising a display device for displaying characters and an image, a browser controller for executing first processing for displaying first display data having the procedure for browsing a desired web page and the content of the web page on the display device so that an operator browses the web page, an e-mail sending and receiving controller for executing second processing for displaying second display data having the procedure for creating an e-mail, the procedure for sending and receiving the e-mail, and the content of the created or received e-mail on the display device so as to send and receive the e-mail, and a switching controller for controlling the browser controller and the e-mail sending and receiving controller in accordance with operator's instructions and displaying the first display data and the second display data on the display device while switching them.

Preferably, when the e-mail is received or the operator instructs the second processing while the browser controller executes the first processing, the switching controller may control the browser controller and the e-mail sending and receiving controller to display the content of the received e-mail or the second display data on the display device.

Preferably, when the e-mail is received or the operator instructs the second processing while the browser controller executes the first processing, the switching controller may control the browser controller and the e-mail sending and receiving means so that the display device displays the first display data and the content of the received e-mail or the second display data on a single screen or separated screens.

Preferably, after the content of the received e-mail is displayed on the display device and a predetermined time passes, the switching controller may control the browser controller and the e-mail sending and receiving controller to display only the first display data on the display device.

Preferably, the mobile terminal may further comprise a copying controller for copying all or a part of the first display data or the second display data displayed on the display device, as all or a part of the second display data or the first display data which is switched and displayed by the switching controller, in accordance with operator's instructions.

Preferably, the mobile terminal may receive the operator's instructions given by at least one of manual operation and voice.

According to a second aspect of the present invention, there is provided a display switching method of a mobile terminal, comprising a browser control step of executing first processing for displaying first display data having the procedure for browsing a desired web page and the content of the web page on a display device so that an operator browses the web page, an e-mail sending and receiving control step of executing second processing for displaying second display data having the procedure for creating an e-mail, the procedure for sending and receiving the e-mail, and the content of the created or received e-mail on the display device so as to send and receive the e-mail, and a switching control step of starting or stopping the execution of the browser control step and the e-mail sending and receiving control step in accordance with operator's instructions and displaying the first display data and the second display data on the display device while switching them.

Preferably, when the e-mail is received or the operator instructs the second processing while executing the first processing in the browser control step, the execution of the browser control step and the e-mail sending and receiving control step may start or stop in the switching control step to display the content of the received e-mail or the second display data on the display device.

Preferably, when the e-mail is received or the operator instructs the second processing while the first processing is executed in the browser control step, the execution of the browser control step and the e-mail sending and receiving step may start or stop in the switching control step so that the display device displays the first display data and the content of the received e-mail or the second display data on a single screen or separated screens.

Preferably, after the content of the received e-mail is displayed on the display device and a predetermined time passes, the execution of the browser control step and the e-mail sending and receiving control step may start or stop in the switching control step to display only the first display data on the display device.

Preferably, a display switching method of a mobile terminal may further comprise a copying step of copying all or a part of the first display data or the second display data displayed on the display device, as all or a part of the second display data or the first display data which is switched and displayed in the switching control step, in accordance with operator's instructions.

More preferably, the mobile terminal may receive the operator's instructions given by at least one of manual operation and voice.

According to a third aspect of the present invention, there is provided a recording medium for recording a computer-executable display switching program, wherein the program comprises a browser control step of executing first processing for displaying first display data having the procedure for browsing a desired web page and the content of the web page on a display device so that an operator browses the web page, an e-mail sending and receiving control step of executing second processing for displaying second display data having the procedure for creating an e-mail, the procedure for sending and receiving the e-mail, and the content of the created or received e-mail on the display device so as to send and receive the e-mail, and a switching control step of starting or stopping the execution of the browser control step and the e-mail sending and receiving control step in accordance with operator's instructions and displaying the first display data and the second display data on the display device while switching them.

Preferably, when the e-mail is received or the operator instructs the second processing while executing the first processing in the browser control step, the execution of the browser control step and the e-mail sending and receiving control step may start or stop in the switching control step to display the content of the received e-mail or the second display data on the display device.

Preferably, when the e-mail is received or the operator instructs the second processing while the first processing is executed in the browser control step, the execution of the browser control step and the e-mail sending and receiving step may start or stop in the switching control step so that the display device displays the first display data and the content of the received e-mail or the second display data on a single screen or separated screens.

Preferably, after the content of the received e-mail is displayed on the display device and a predetermined time passes, the execution of the browser control step and the e-mail sending and receiving control step may start or stop in the switching control step to display only the first display data on the display device.

Preferably, the program may further comprise a copying step of copying all or a part of the first display data or the second display data displayed on the display device, as all or a part of the second display data or the first display data which is switched and displayed in the switching control step, in accordance with operator's instructions.

Preferably, the mobile terminal may receive the operator's instructions as at least one of manual operation and voice.

BRIEF DESCRIPTION OF THE DRAWINGS

FIGS. 3A to 3C are diagrams for illustrating the conventional art;

FIGS. 4A to 4C are diagrams for illustrating the conventional art;

FIG. 15 is a diagram showing a display example of a display device in a mobile phone in one modification of the second embodiment of the present invention; and FIG. 16 is a diagram showing a display example of a display device in a mobile phone in another modification of the second embodiment of the present invention.

DESCRIPTION OF THE PREFERRED EMBODIMENTS

Figure 1:
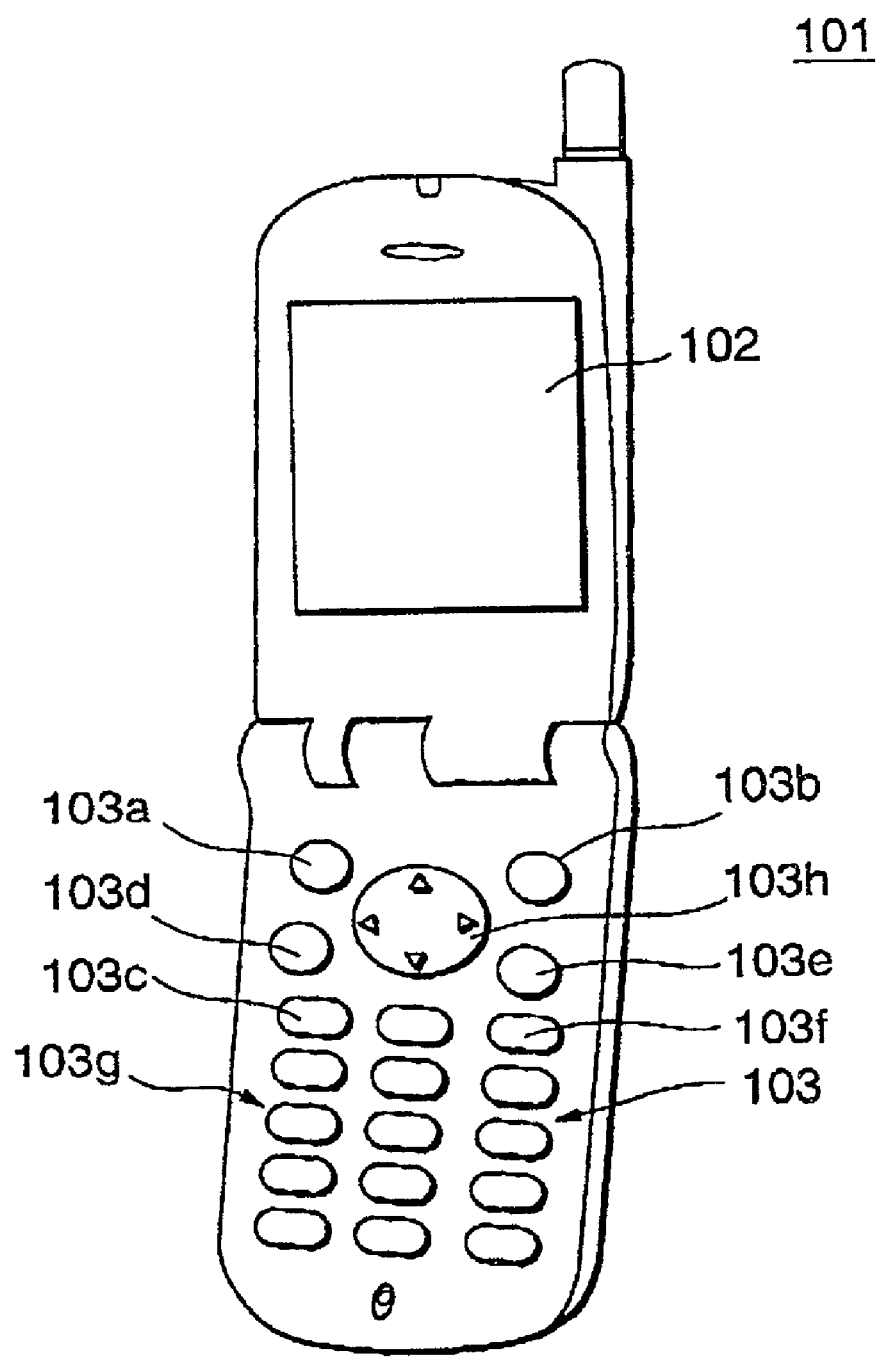
FIG. 1 is a diagram for illustrating a conventional art.
Figure 2:
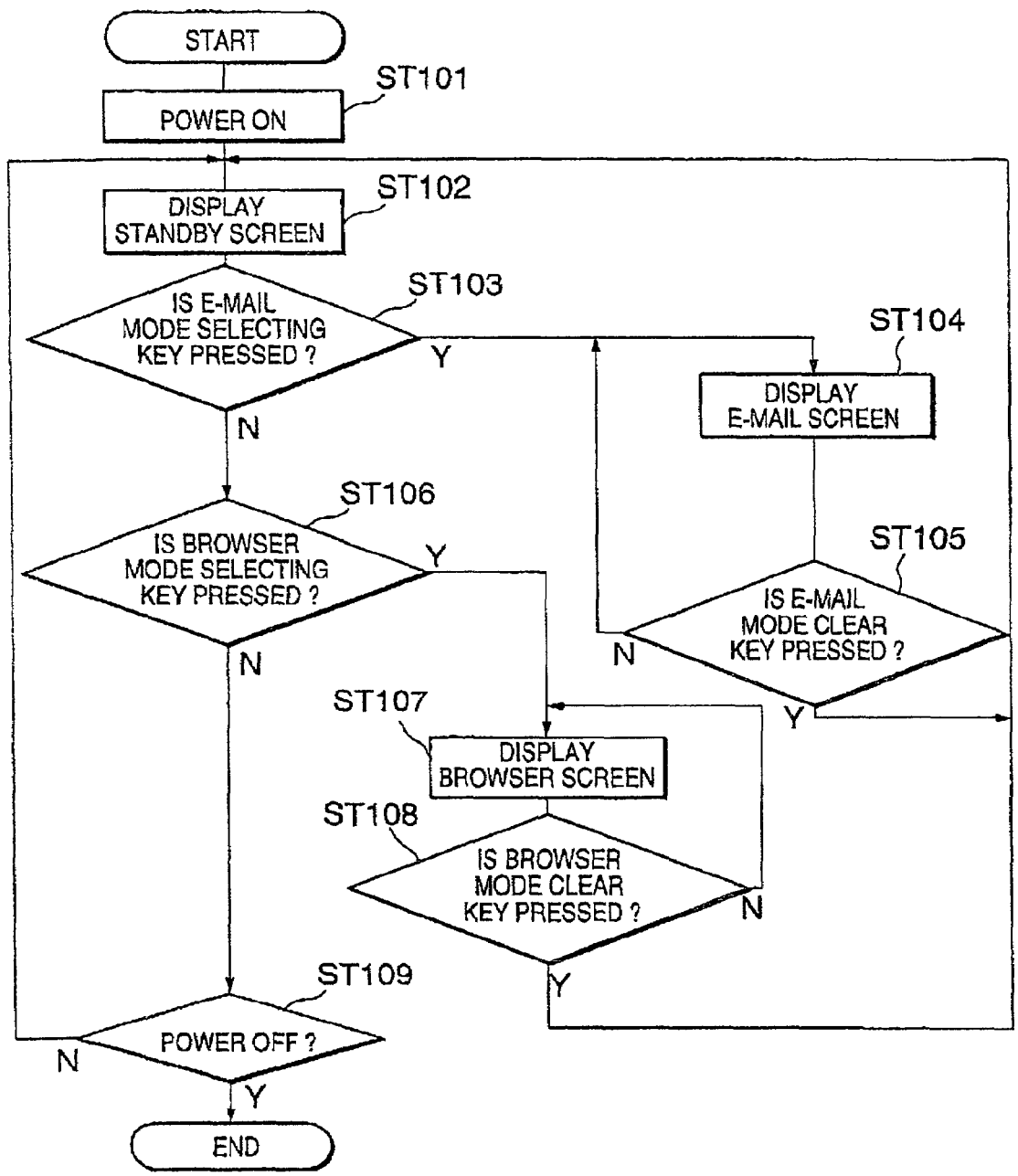
FIG. 2 is a flowchart for illustrating operations of the conventional art.
Figure 5:
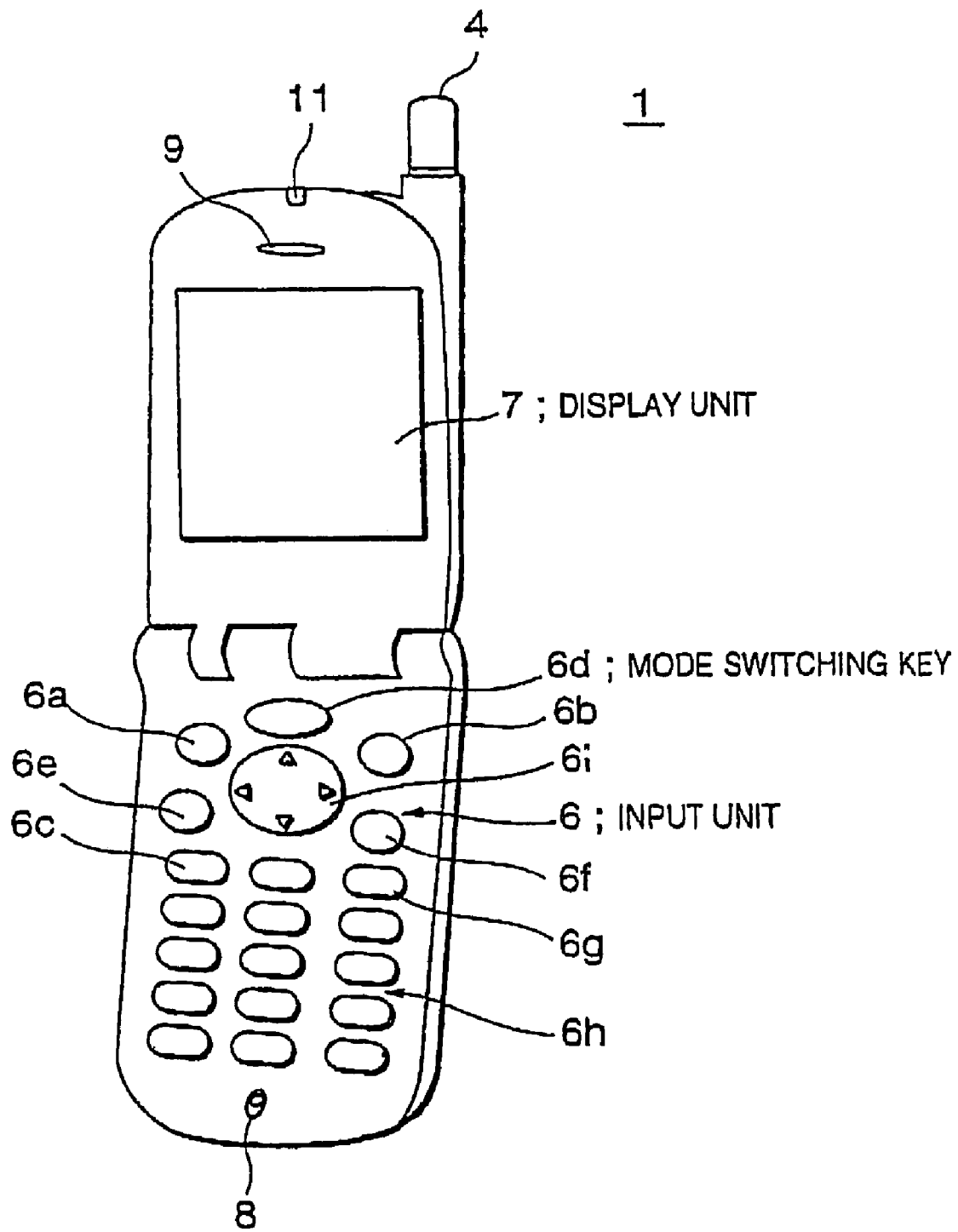
FIG. 5 is a perspective view showing the structure of a mobile phone according to a first embodiment of the present invention.
Figure 6:
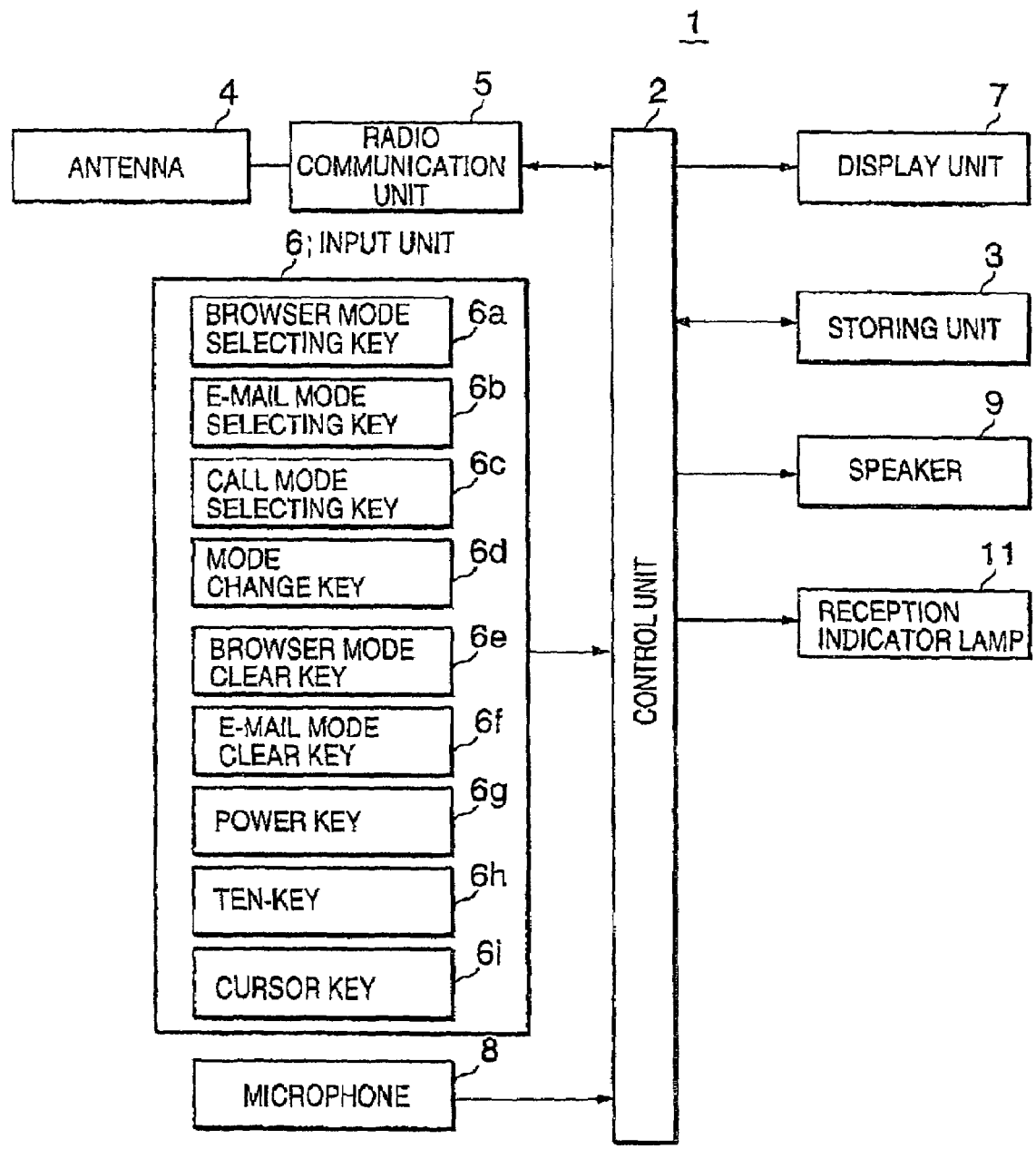
FIG. 6 is a block diagram showing the structure of the mobile phone according to the first embodiment.
Figure 7:
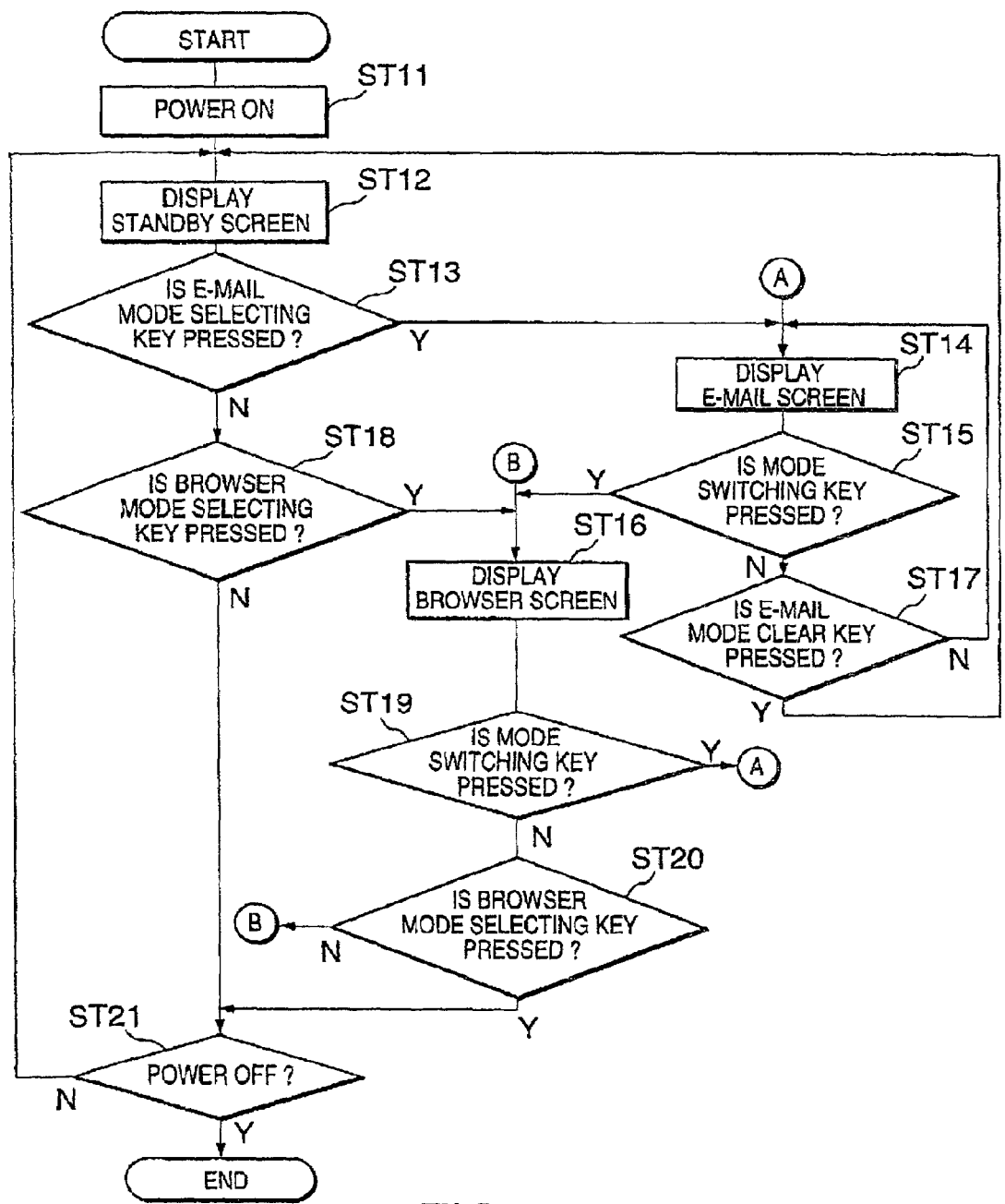
FIG. 7 is a flowchart for explaining operations of the mobile phone according to the first embodiment.
Figure 8:
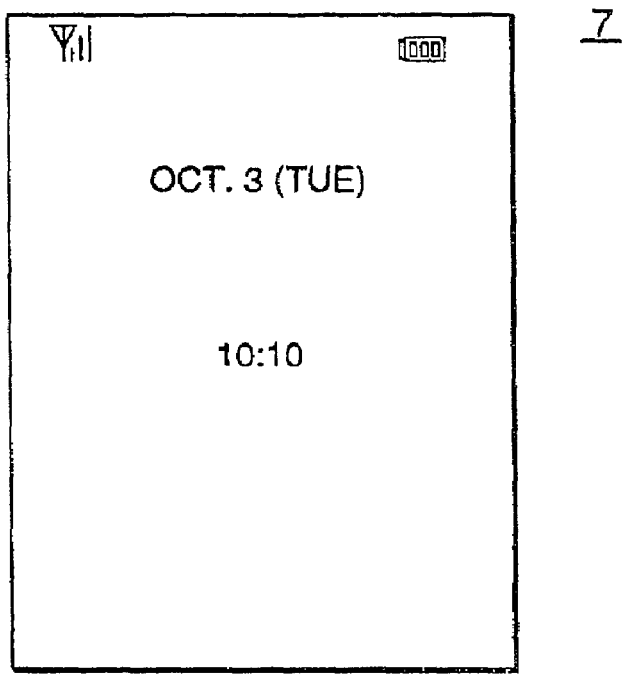
FIG. 8 is a diagram showing one display example of a display device in the mobile phone according to the first embodiment.
Figure 9:
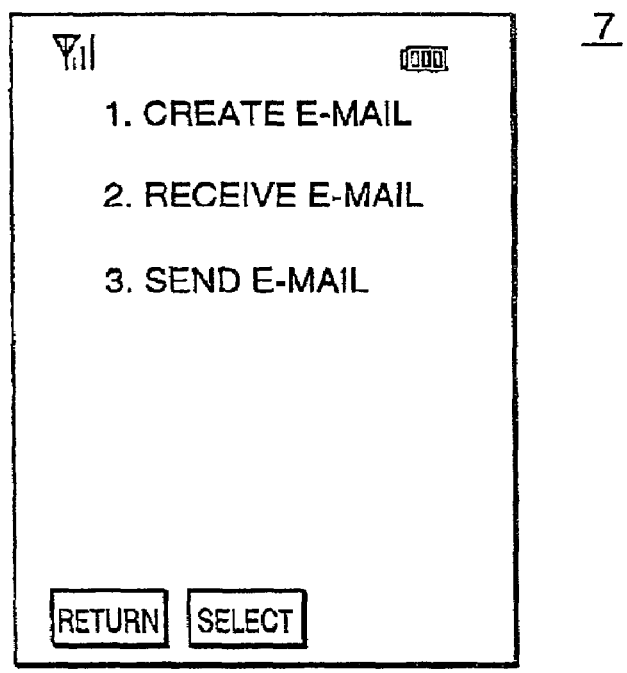
FIG. 9 is a diagram showing another display example of the display device in the mobile phone according to the first embodiment.
Figure 10:
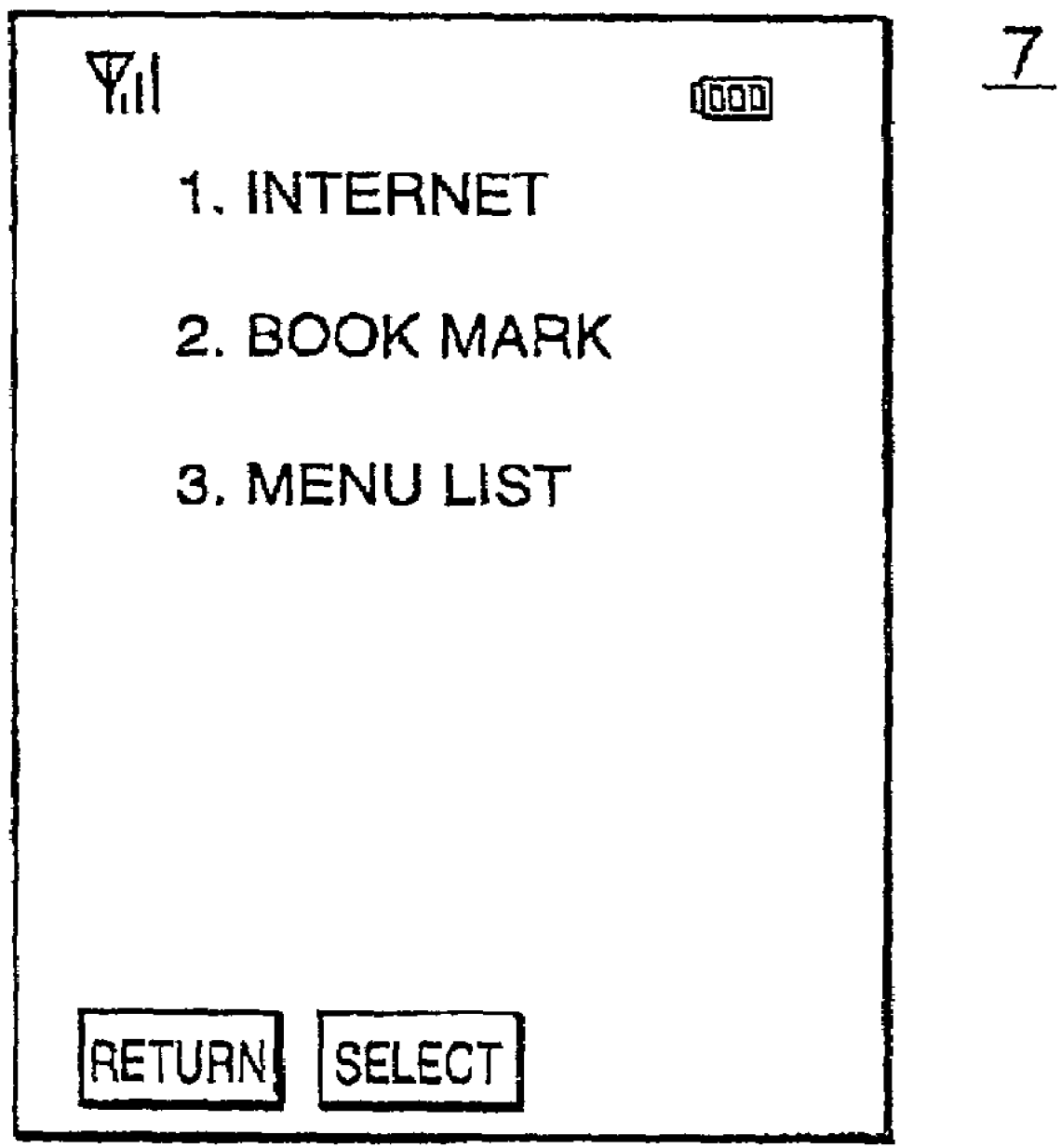
FIG. 10 is a diagram showing another display example of the display device in the mobile phone according to the first embodiment.

Hereinbelow, a description is given of first to third embodiments of the present invention with reference to the drawings First Embodiment FIG. 5 is a perspective view showing the structure of a mobile phone according to the first embodiment of the present invention, FIG. 6 is a block diagram showing the structure of the mobile phone, FIG. 7 is a flowchart for explaining operations of the mobile phone, and FIGS. 8 to 10 are diagrams showing display examples of a display device in the mobile phone.

According to the first embodiment, a mobile phone (mobile terminal) 1 has not only an inherent call function but also function for data communication function through packet switching, which is capable of accessing the Internet, browsing a web page, and sending and receiving an e-mail. Referring to FIGS. 5 and 6, the mobile phone 1 comprises a control unit 2 for controlling components of a main body thereof, a storing unit 3 for storing various data and processing programs executed by the control unit 2, an antenna 4 for transmitting and receiving radio, a radio communication unit 5 for transmitting voice and data by modulating them through the antenna 4 as radio and performing call and data communication in accordance with a predetermined protocol by receiving and demodulating the radio as the voice and the data through the antenna 4, an input unit (operating unit) 6 comprising operational keys, a display device 7 having a liquid crystal display device, a microphone 8 for inputting voice, a speaker 9 for outputting voice, and a reception indication lamp 11 for indicating the reception by light-on.

The control unit 2 is used as a browser controller, an e-mail sending and receiving controller, and a switching controller, and executes processing programs stored in the storing unit 3, such as a browser as a program for browsing a web page, a mailer as a program for creating, sending, and receiving an e-mail, and a switching control program for switching a browser screen and an e-mail screen. Further, the control unit 2 controls the components by using registers and flags stored in the storing unit 3, thus issuing instructions for transmitting information, managing information, and the like.

The control unit 2 also controls the components in accordance with the operator's key operation via the input unit 6 in a browser mode for browsing the web page, in an e-mail mode for creating, sending, and receiving the e-mail, and in a call mode for phone.

The storing unit 3 comprises semiconductor memories such as a ROM and a RAM, stores processing programs, such as the browser and the-mailer which are executed by the control unit 2 and the switching control program for switching the browser mode screen and the e-mail mode screen, and information such as received information, and further stores registers and flags which are used when the control unit 2 executes the above programs.

As shown in FIGS. 5 and 6, the input unit 6 comprises a browser mode selecting key 6a for browsing the web page by starting the browser, an e-mail mode selecting key 6b for creating, sending, and receiving the e-mail, a call mode selecting key 6c for voice call, a mode switching key 6d for switching the browser mode and the e-mail mode, a browser mode clear key 6e for shifting to the standby mode of the operation and the reception from the browser mode and displaying the standby screen, an e-mail mode clear key 6f for shifting to the standby mode of the operation and the reception from the e-mail mode and displaying the standby screen, a power key 6g, a ten-key 6h for inputting numbers, and a cursor key 6i for moving the cursor in the vertical and horizontal directions on a display screen of the display device 7.

Operations of the mobile phone 1 will be described according to the first embodiment with reference to FIGS. 7 to 10.

First, power is turned on (step ST11), then, the control unit 2 enters the standby mode of operator's input operation and reception and the display device 7 displays the standby screen as shown in FIG. 8 (step ST12).

The operator, as a secretary of an alumni association, presses the e-mail mode selecting key 6b to send information to members via the e-mail in the standby mode (step ST13). The control unit 2 shifts to the e-mail mode in which the display device 7 displays a menu selecting screen as shown in FIG. 9 (step ST14).

The operator presses the mode switching key 6d to browse the web page of a restaurant as the party place of the alumni association so as to check the detailed content of the alumni association during creating the information (step ST15). The control unit 2 shifts to the browser mode in which the display device 7 displays the menu selecting screen as shown in FIG. 10 (step ST16). If the mode switching key 6d is not pressed and the e-mail mode clear key 6f is pressed (step ST17), the control unit 2 returns to the standby mode in which the display device 7 displays the standby screen as shown in FIG. 8.

If the neither the mode switching key 6d nor the e-mail mode clear key 6f is pressed, the e-mail screen is continuously displayed.

In step ST16, the browser screen is displayed and the operator checks the content of the web page and thereafter presses the mode switching key 6d (step ST19) whereupon the processing routine returns to step ST14 and the control unit 2 is switched to the e-mail mode in which the display device 7 displays the information during creation thereof. After that, the operator continuously creates the information and sends the e-mail.

When the operator desires to check the content of the web page again to include the telephone number and the location of the party place in the information during creating the information, he views the browser screen at the previous switching time by pressing the mode switching key 6d again.

When the operator presses the browser mode clear key 6e without pressing the mode switching key 6d in step ST20, the processing routine proceeds to step ST21. If the power is not turned off in step ST21, the control unit 2 returns to the standby mode in which the standby screen is displayed as shown in FIG. 8.

When the e-mail mode selecting key 6d is not pressed in step ST13 and the browser mode selecting key 6a is pressed in step ST18, the control unit 2 shifts to the browser mode in which the display device 7 displays the menu selecting screen as shown in FIG. 10 (step ST16).

When neither the mode switching key 6d nor the browser mode clear key 6e is pressed in steps ST13 and ST18, the processing routine returns to step ST16 whereupon the browser screen is continuously displayed.

When the e-mail mode selecting key 6d is not pressed in step ST13 and the browser mode selecting key 6a is not pressed in step ST18, the processing routine advances to step ST21. If power is not turned off in step ST21, the control unit 2 is continuously in the standby mode and the standby screen is displayed.

In the configuration, the e-mail mode can easily be switched from the browser mode by pressing the mode switching key 6d.

Since the display device 7 returns to the screen interrupted at the previous time by pressing the mode switching key 6d again, it is unnecessary to restart the operation from the standby screen and the number of times for operating the operational keys can be reduced.

That is, according to the conventional art, the display screen switches to the screen for inputting the information shown in FIG. 3C from the screen shown in FIG. 4C by operating keys at least four times. On the other hand, if the information is created in the e-mail mode before shifting to the browser mode, the mode switching key 6d is pressed only once.

In particular, the input operation can be performed by alternately checking the content of the browser screen and the content of the e-mail screen. Therefore, the operations for creating the e-mail can easily and certainly be executed.

Second Embodiment

Figure 11:
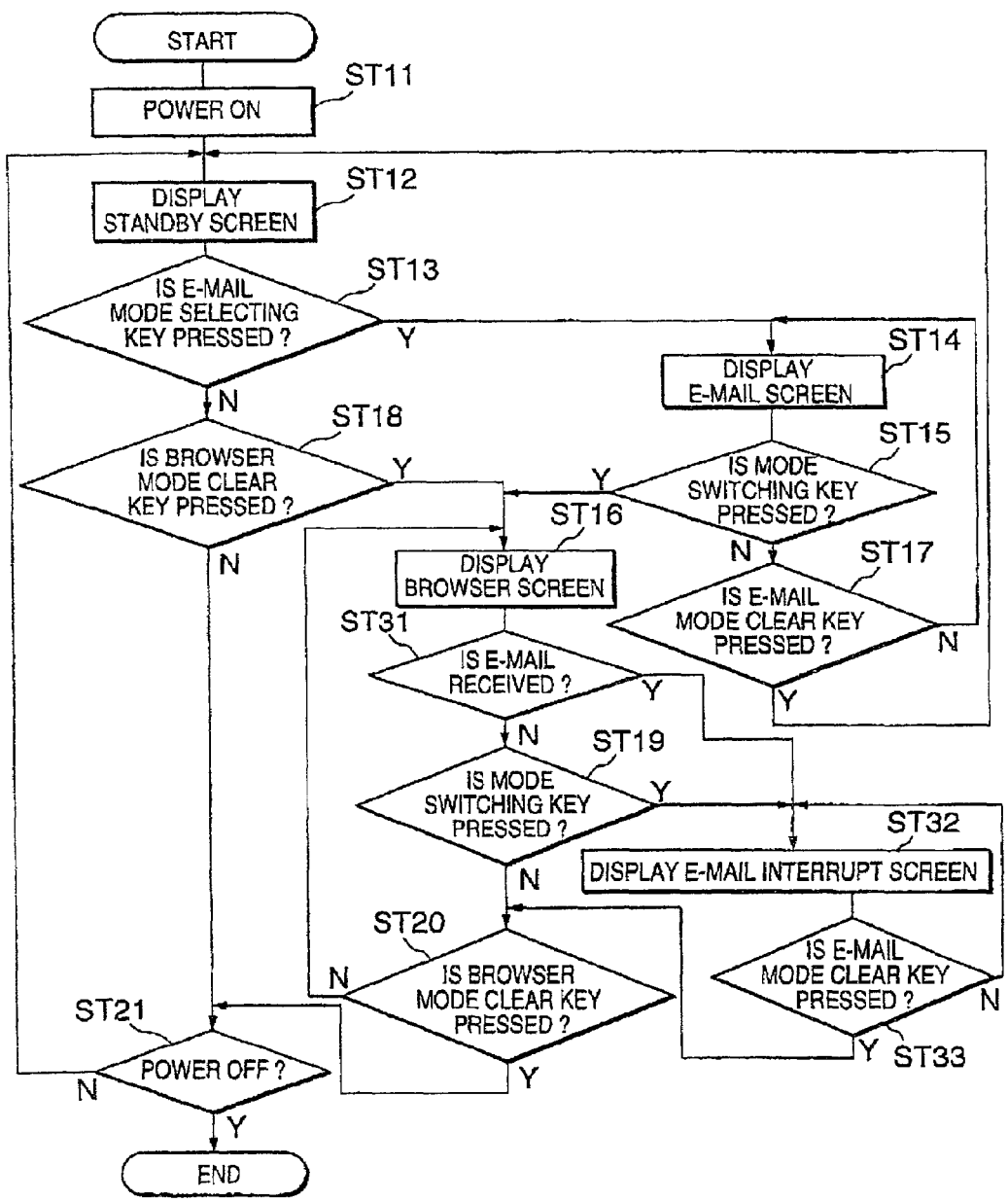
FIG. 11 is a flowchart for explaining operations of a mobile phone according to a second embodiment of the present invention.
Figure 12:
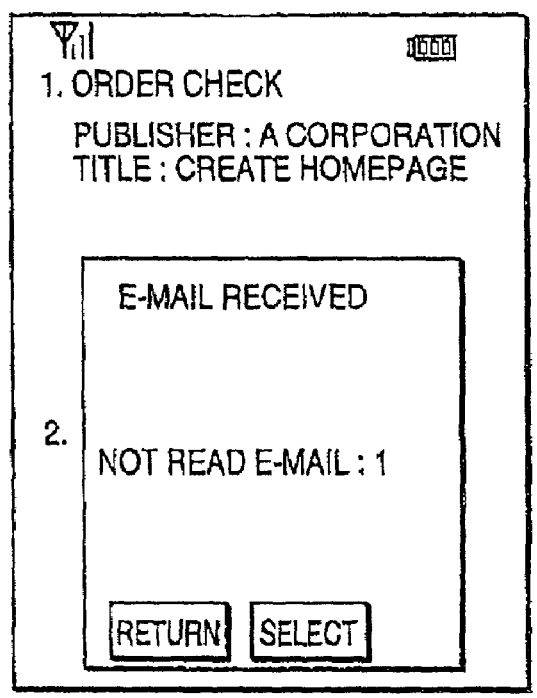
FIG. 12 is a diagram showing a display example of a display device in the mobile phone according to the second embodiment.

FIG. 11 is a flowchart for explaining operations of a mobile phone according to a second embodiment of the present invention, and FIG. 12 is a diagram showing a display example of a display device in the mobile phone.

According to the second embodiment, differently from the first embodiment, when there is a reception of the e-mail, interrupt processing is performed. Except for this point, the configuration according to the second embodiment is substantially similar to that of the first embodiment and the description is omitted.

Next, a description is given of operations of the mobile phone according to the second embodiment.

When the mode switching key 6d is pressed in step ST15 or the browser mode selecting key 6a is pressed in step ST18, the control unit 2 shifts to the browser mode in which the display device 7 displays the menu selecting screen as shown in FIG. 10 (step ST16).

If the e-mail is received in the browser mode (step ST31), the control unit 2 automatically shifts to the e-mail mode in which the display device 7 displays an e-mail interrupt screen to overwrite content data on a part of the browser screen (step ST32). The operator selects a folder in which an unread e-mail is stored and reads the text of the stored e-mail.

Thereafter, the e-mail mode clear key 6f is pressed (step ST33), the processing routine proceeds to step ST20. If the e-mail mode clear key 6f is not pressed (step ST33), the e-mail interrupt screen is continuously displayed.

If the e-mail is not received in step ST31, the mode switching key 6d is pressed (step ST19), the control unit 2 is switched to the e-mail mode. Then, the processing routine advances to step ST32 whereupon the e-mail interrupt screen is displayed.

If the mode switching key 6d is not pressed in step ST19, the processing routine advances to step ST20.

If the browser mode clear key 6e is pressed in step ST20, the processing routine advances to step ST21. If power is not turned off in step ST21 the control unit 2 returns to the standby mode in which the display device 7 displays the standby screen as shown in FIG. 8. If neither the mode switching key 6d nor the browser mode clear key 6e is pressed, the processing routine returns to step ST16 whereupon the browser mode screen is continuously displayed.

If the e-mail mode selecting key 6b is not pressed in step ST13 and the browser mode selecting key 6a is not pressed in step ST18, the processing routine progresses to step ST21. If power is not turned off in step ST21, the standby mode continues and the standby screen is displayed.

In the configuration, it is possible to obtain the advantage which is substantially similar to that of the first embodiment.

In addition, when the e-mail is received, the processing in the browser mode is interrupted and the operator promptly checks the received e-mail and reads it. Therefore, the miss of an urgent message can be prevented. After checking the e-mail, the interrupted processing in the browser mode can continue and, therefore, the operability can be improved.

Third Embodiment

Figure 13:
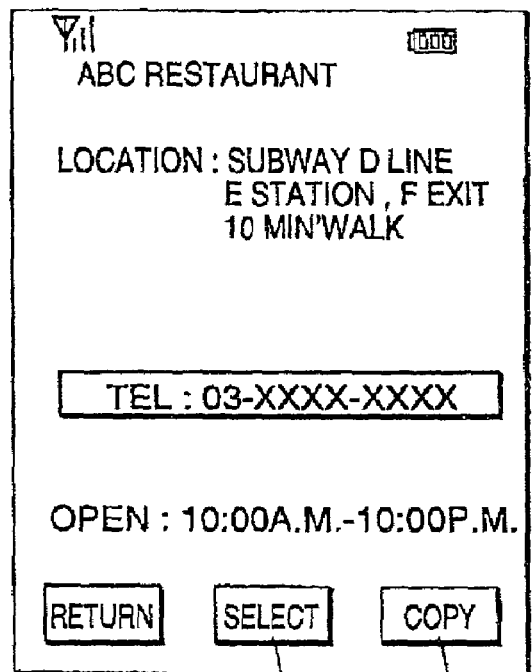
FIG. 13 is a diagram showing one display example of a display device in a mobile phone according to a third embodiment of the present invention.
Figure 14:
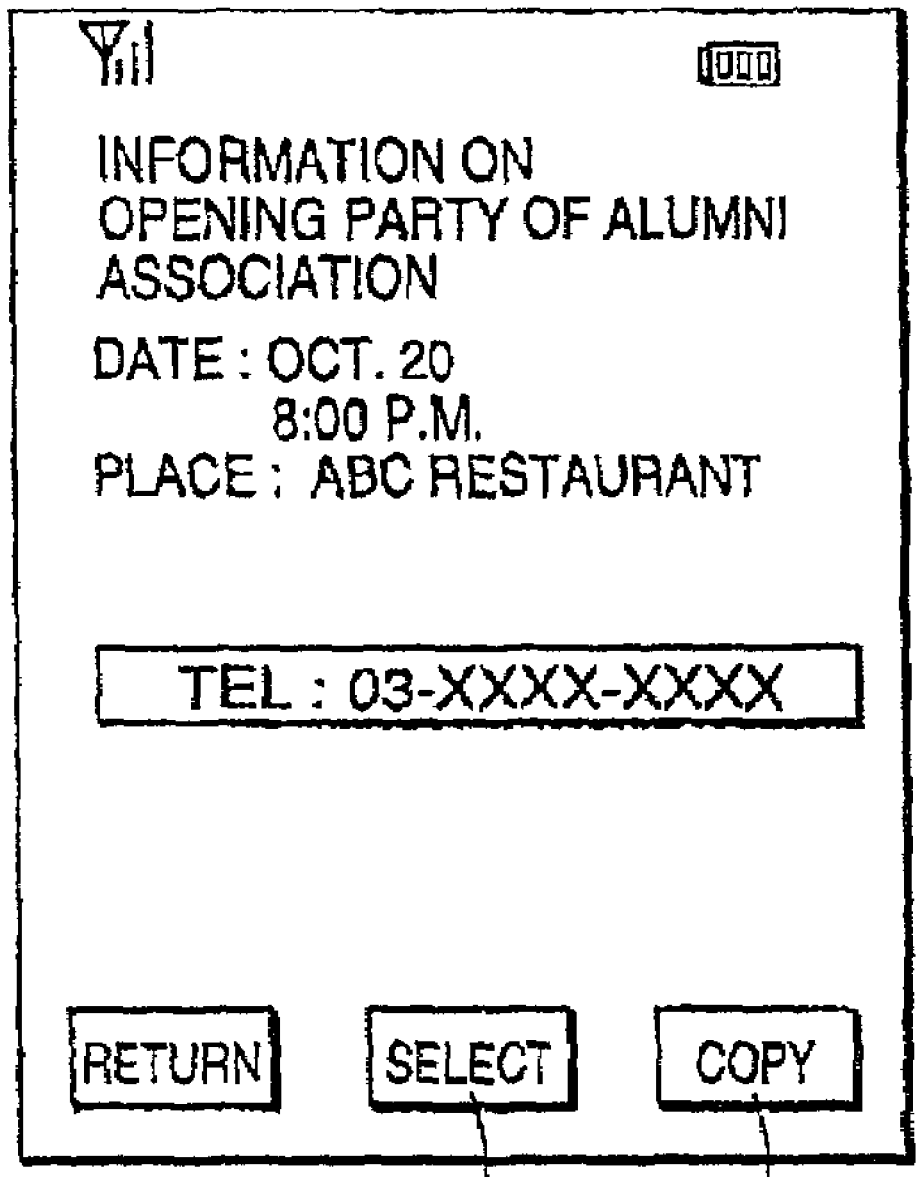
FIG. 14 is a diagram showing another display example of the display device according to the third embodiment.

FIGS. 13 and 14 are diagrams showing display examples of a display device in a mobile phone according to a third embodiment of the present invention.

According to the third embodiment, differently from the first embodiment, the mobile phone has a function for copying a part of the content on the browser screen at a predetermined portion on the e-mail screen, after switching the mode.

Excluding the foregoing, the configuration according to the third embodiment is substantially the same as that of the first embodiment and the description is omitted.

The control unit 2 is used as a copying controller, besides the e-mail sending and receiving controller and the switching controller. Under the control of the control unit 2, the copy content is specified on the browser screen by using the cursor key 6i, etc. and is temporarily stored in the storing unit 3. The operator presses the mode switching key 6d, thus shifting to the e-mail mode. The copy content is displayed at the copy destination specified on the e-mail screen.

Next, a description is given of operations of the mobile phone according to the third embodiment.

Under the control of the control unit 2, the e-mail screen is displayed in step ST14. The operator presses the mode switching key 6d during creating the information of the alumni association on the e-mail screen in step ST15, and then, the control unit 2 shifts to the browser mode. In accordance with the operator's key operation, the control unit 2 accesses the web page of the restaurant, thereby displaying the browser screen as shown in FIG. 13.

When the operator copies the telephone number to the information on the e-mail screen, a copy key 71 is pressed on the e-mail screen by using the cursor key 6i, thus inputting the instructions for copy. Thereafter, a display area of the telephone number is specified on the browser screen by using the cursor key 6i and the display area specified is determined by using a selecting key 72.

In step ST19, the operator presses the mode switching key 6d again and the control unit 2 shifts to the e-mail mode in which the display device 7 displays the interrupted e-mail screen as shown in FIG. 14.

The operator specifies the position of copy destination of the telephone number on the e-mail screen by using the cursor key 6i and the instructions are inputted by using the selecting key 72, thus copying the telephone number.

In the configuration of the third embodiment, it is possible to obtain the advantage which is substantially the same as that of the first embodiment.

Since the contents of the browser screen and the content of the e-mail are alternately checked and the content of either one can be copied when necessary. The text can easily and accurately be created for a short time.

Although the first to third embodiments of the present invention are described in detail with reference to the drawings, the specific configuration is not limited to the embodiments and the present invention is intended to cover various modifications included within the spirit and scope of the present invention.

For example, the browser mode clear key 6e and the e-mail mode clear key 6f are provided in the first embodiment. However, they may be shared, and thus, the number of keys can be reduced.

When the e-mail mode selecting key 6b is pressed in the browser mode, the control unit 2 may shift to the e-mail mode. Accordingly, the dedicated mode switching key 6d can be omitted.

Although the case in which the content is overwritten on the e-mail screen upon reception is described according to the second embodiment, the e-mail screen may be separated into up and down portions as shown in FIG. 15. In addition to the screen separation into the up and down portions, the e-mail screen may be separated into right and left portions as shown in FIG. 16. Accordingly, the content of the browser mode screen can easily be checked.

If a predetermined time passes after the e-mail is received and the interrupt screen is displayed according to the second embodiment, the control unit may automatically be switched to the browser mode. Accordingly, the operator can preferentially perform the processing in the browser mode with the reduced number of key operations.

In addition to the key operations, the operation may be instructed through voice. Accordingly, further, the operability can be improved.

The operator may use not only the mobile phone but also a PHS (Personal Handy Phone System) and a PDA (Personal Digital Assistant) having a radio communication function, as a radio portable terminal. In this case, it is advantageous similarly with the case of the mobile phone.

As mentioned above, in the present invention, for example, the screen displaying first display data can easily be switched to the screen displaying the second display data. Therefore, the number of operations of the operational switch can be reduced and the operability can be improved.

Data can be inputted while alternately checking the content of the first display data and the content of the second display data. Therefore, the operation can certainly be performed for a short time.

When the e-mail is received during executing the first processing, the switching controller interrupts the first processing and the display device displays the content of the e-mail. Thus, the operator can promptly check the content of the e-mail received and the miss of an urgent message can be prevented.

For instance, the copying controller copies one of the contents of the first display data and the second display data while alternately checking the contents of both of them when necessary. Accordingly, the text or the like can precisely and easily be created for a short time.

What is claimed is:

1. A mobile terminal comprising:
a display device for displaying characters and an image;
a browser controller for executing first processing for displaying first display data having a procedure for browsing a desired web page and the content of the web page on said display device so that an operator browses the web page;
an e-mail sending and receiving controller for executing second processing for displaying second display data having a procedure for creating an e-mail, a procedure for sending and receiving the e-mail, and the content of the created or received e-mail on said display device so as to send and receive the e-mail; and
a single switching member for switching between said browser controller and said e-mail sending and receiving controller upon toggling said single switching member, and displaying said first display data and said second display data on said display device while switching them with said single switching member.

2. The mobile terminal claimed in claim 1, wherein when the e-mail is received or the operator instructs said second processing while said browser controller executes said first processing, said switching controller controls said browser controller and said e-mail sending and receiving controller to display the content of the received e-mail or said second display data on said display device.

3. The mobile terminal claimed in claim 1, wherein when the email is received or the operator instructs said second processing while said browser controller executes said first processing, said switching controller controls said browser controller and said email sending and receiving controller so that said display device displays said first display data and the content of the received e-mail or said second display data on a single screen or separated screens.

4. The mobile terminal claimed in claim 1, wherein after the content of the received e-mail is displayed on said display device and a predetermined time passes, said switching controller controls said browser controller and said e-mail sending and receiving controller to display only said first display data on said display device.

5. The mobile terminal claimed in claim 1, further comprising:
a copying controller for copying all or a part of said first display data or said second display data displayed on said display device, as all or a part of said second display data or said first display data which is switched and displayed by said switching controller, in accordance with operator's instructions.

6. The mobile terminal claimed in claim 1, receiving said operator's instructions as at least one of manual operation and voice.

7. A display switching method of a mobile terminal, comprising:
a browser control step of executing first processing for displaying first display data having a procedure for browsing a desired web page and the content of the web page on a display device so that an operator browses the web page;
an e-mail sending and receiving control step of executing second processing for displaying second display data having a procedure for creating an e-mail, the procedure for sending and receiving the e-mail, and the content of the created or received e-mail on said display device so as to send and receive the e-mail; and
a switching step of starting or stopping the execution of said browser control step and said e-mail sending and receiving control step in accordance with operator's instructions by pressing only a single switching member to display said first display data or said second display data on said display device while switching between them.

8. The display switching method of a mobile terminal claimed in claim 7, wherein when the e-mail is received or the operator instructs said second processing while executing said first processing in said browser control step, the execution of said browser control step and said e-mail sending and receiving control step starts or stops in said switching control step to display the content of the received e-mail or said second display data on said display device.

9. The display switching method of a mobile terminal claimed in claim 7, wherein when the e-mail is received or the operator instructs said second processing while said first processing is executed in said browser control step, the execution of said browser control step and said e-mail sending and receiving step starts or stops in said switching control step so that said display device displays said first display data and the content of the received e-mail or said second display data on a single screen or separated screens.

10. The display switching method of a mobile terminal claimed in claim 7, wherein after the content of the received e-mail is displayed on said display device and a predetermined time passes, the execution of said browser control step and said e-mail sending and receiving control step starts or stops in said switching control step to display only said first display data on said display device.

11. The display switching method of a mobile terminal claimed in claim 7, further comprising:
a copying step of copying all or a part of said first display data or said second display data displayed on said display device, as all or a part of said second display data or said first display data which is switched and displayed in said switching control step, in accordance with operator's instructions.

12. The display switching method of a mobile terminal claimed in claim 7, wherein said mobile terminal receives said operator's instructions as at least one of manual operation and voice.

13. A computer readable medium encoded with a program capable of being executed by a computer to display a switching program, wherein said program comprises:

a browser control step of executing first processing for displaying first display data having a procedure for browsing a desired web page and the content of the web page on a display device so that an operator browses the web page;
an e-mail sending and receiving control step of executing second processing for displaying second display data having a procedure for creating an e-mail, the procedure for sending and receiving the e-mail, and the content of the created or received e-mail on said display device so as to send and receive the e-mail; and
a switching step of starting or stopping execution of said browser control step and said e-mail sending and receiving control step in accordance with operator's instructions by pressing only a single switching member to alternately display said first display data or said second display data on said display device.

14. The computer readable medium claimed in claim 13, wherein when the e-mail is received or the operator instructs said. second processing while executing said first processing in said browser control step, the execution of said browser control step and said e-mail sending and receiving control step starts or stops in said switching control step to display the content of the received e-mail or said second display data on said display device.

15. The computer reeadable medium claimed in claim 13, wherein when the e-mail is received or the operator instructs said second processing while said first processing is executed in said browser control step, the execution of said browser control step and said e-mail sending and receiving step starts or stops in said switching control step so that said display device displays said first display data and the content of the received e-mail or said second display data on a single screen or separated screens.

16. The computer readable medium claimed in claim 13, wherein after the content of the received e-mail is displayed on said display device and a predetermined time passes, the execution of said browser control step and said e-mail sending and receiving control step starts or stops in said switching control step to display only said first display data on said display device.

17. The computer readable medium claimed in claim 13, wherein said program further comprises:
a copying step of copying all or a part of said first display data or said second display data displayed on said display device, as all or a part of said second display data or said first display data which is switched and displayed in said switching control step, in accordance with operator's instructions.

18. The computer readable medium claimed in claim 13, wherein said operator's instructions are received as at least one of manual operation and voice.

19. A mobile terminal comprising:
a display device;
a browser controller for browsing a desired web page, so that browser content of the web page is displayed on said display device;
an e-mail sending and receiving controller for creating, sending and receiving email, so that e-mail content is displayed on said display device; and
a single switch for switching between said browser controller and said e-mail sending and receiving controller, so that at least one of said browser content and said e-mail content are displayed on said display device when said single switch is toggled.

* * * * *